(12) United States Patent
Batenburg et al.

(10) Patent No.: US 9,897,055 B2
(45) Date of Patent: Feb. 20, 2018

(54) METHOD AND SYSTEM FOR DELIVERING A GASEOUS FUEL INTO THE AIR INTAKE SYSTEM OF AN INTERNAL COMBUSTION ENGINE

(71) Applicant: WESTPORT POWER INC., Vancouver (CA)

(72) Inventors: Gregory A. Batenburg, Delta (CA); Anuja S. Bengali, Surrey (CA); Gage Garner, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 86 days.

(21) Appl. No.: 15/037,622

(22) PCT Filed: Nov. 19, 2014

(86) PCT No.: PCT/CA2014/051106
§ 371 (c)(1),
(2) Date: May 18, 2016

(87) PCT Pub. No.: WO2015/074148
PCT Pub. Date: May 28, 2015

(65) Prior Publication Data
US 2016/0290297 A1 Oct. 6, 2016

(30) Foreign Application Priority Data

Nov. 21, 2013 (CA) ..................................... 2833619

(51) Int. Cl.
*F02M 1/00* (2006.01)
*F02M 59/44* (2006.01)
(Continued)

(52) U.S. Cl.
CPC ............. *F02M 59/44* (2013.01); *F02B 43/00* (2013.01); *F02D 19/023* (2013.01);
(Continued)

(58) Field of Classification Search
CPC .. F02D 41/3845; F02D 41/20; F02D 19/0642; F02D 19/0647; F02D 19/00;
(Continued)

(56) References Cited

U.S. PATENT DOCUMENTS

| | | | |
|---|---|---|---|
| 4,947,651 A | 8/1990 | Neeser et al. | |
| 5,421,161 A | 6/1995 | Gustafson | |

(Continued)

OTHER PUBLICATIONS

International Search Report and Written Opinion, dated Jan. 22, 2015, for PCT/CA2014/051106, 7 pages.
(Continued)

*Primary Examiner* — John Kwon
(74) *Attorney, Agent, or Firm* — Seed IP Law Group LLP (57) ABSTRACT

A method and system is disclosed for delivering a cryogenically stored fuel in a gaseous state into the air intake system of a gaseous fuelled internal combustion engine. The method comprises determining the flow rate capacity in the engine system's fuel delivery line, comparing the determined flow rate capacity to a required flow rate demand and supplying fuel in gaseous state directly from the vapor space of the cryogenic storage vessel to the fuel delivery line that supplies fuel to the engine, when the flow rate capacity is equal to or higher than the required flow rate demand. The method further comprises activating a cryogenic pump to deliver fuel to the internal combustion engine from the liquid space of the cryogenic storage vessel when the determined flow rate capacity is lower than the required flow rate demand.

20 Claims, 8 Drawing Sheets

(51) Int. Cl.
  *F02B 43/00* (2006.01)
  *F17C 9/00* (2006.01)
  *F02M 21/02* (2006.01)
  *F02D 19/02* (2006.01)
  *F17C 9/02* (2006.01)
  *F17C 13/02* (2006.01)
  *F02M 65/00* (2006.01)

(52) U.S. Cl.
  CPC ....... *F02D 19/027* (2013.01); *F02M 21/0215* (2013.01); *F02M 21/0224* (2013.01); *F02M 21/0287* (2013.01); *F02M 65/00* (2013.01); *F17C 9/00* (2013.01); *F17C 9/02* (2013.01); *F17C 13/025* (2013.01); *F17C 13/026* (2013.01); *F17C 2201/0109* (2013.01); *F17C 2201/035* (2013.01); *F17C 2201/056* (2013.01); *F17C 2205/0338* (2013.01); *F17C 2221/033* (2013.01); *F17C 2223/0161* (2013.01); *F17C 2223/033* (2013.01); *F17C 2223/043* (2013.01); *F17C 2223/047* (2013.01); *F17C 2225/0123* (2013.01); *F17C 2225/035* (2013.01); *F17C 2227/0135* (2013.01); *F17C 2227/0178* (2013.01); *F17C 2227/0323* (2013.01); *F17C 2250/03* (2013.01); *F17C 2250/043* (2013.01); *F17C 2250/0439* (2013.01); *F17C 2250/0443* (2013.01); *F17C 2250/0626* (2013.01); *F17C 2250/0636* (2013.01); *F17C 2250/0689* (2013.01); *F17C 2265/032* (2013.01); *F17C 2265/066* (2013.01); *F17C 2270/0168* (2013.01); *Y02T 10/32* (2013.01)

(58) Field of Classification Search
  CPC ............ F02D 19/0613; F02M 37/0029; F02M 21/0245; F15B 9/00; F16J 1/09
  USPC ....... 123/445, 446, 472, 480, 495, 497, 500, 123/501, 525, 575, 576; 417/53, 437, 417/440
  See application file for complete search history.

(56) References Cited

U.S. PATENT DOCUMENTS

| | | |
|---|---|---|
| 5,937,655 A | 8/1999 | Weller et al. |
| 6,581,572 B1* | 6/2003 | Hurley ................ F02D 41/2422 123/478 |
| 8,443,820 B2 | 5/2013 | Ulrey et al. |
| 2003/0221433 A1 | 12/2003 | Gustafson |
| 2008/0276627 A1 | 11/2008 | Lee et al. |
| 2009/0157277 A1 | 6/2009 | Pursifull et al. |
| 2011/0146605 A1 | 6/2011 | Dixon et al. |
| 2011/0301826 A1 | 12/2011 | Galindo et al. |
| 2012/0180760 A1 | 7/2012 | Hagen |
| 2013/0255646 A1 | 10/2013 | Ulrey et al. |
| 2016/0017835 A1* | 1/2016 | Garner .................... F17C 5/007 123/458 |
| 2016/0025042 A1* | 1/2016 | Batenburg ............. F02M 21/02 123/3 |
| 2016/0252057 A1* | 9/2016 | Batenburg ............. F04B 23/04 123/495 |

OTHER PUBLICATIONS

Extended European Search Report, dated Jul. 11, 2017, for European Application No. 14863801.8-1616, 6 pages.

* cited by examiner

METHOD AND SYSTEM FOR DELIVERING A GASEOUS FUEL INTO THE AIR INTAKE SYSTEM OF AN INTERNAL COMBUSTION ENGINE

TECHNICAL FIELD

The present disclosure relates to a method and a system for delivering a cryogenically stored fuel to the air intake system of gaseous fuelled internal combustion engine.

BACKGROUND

A fuel storage and delivery system for an internal combustion engine that is fuelled with a gaseous fuel such as natural gas, is an example of an application that is particularly suited for the disclosed method and system. Natural gas has been used to fuel vehicle engines for many years. The fuel supplied to a natural gas driven vehicle is stored either in a liquefied natural gas (LNG) tank or in a compressed natural gas (CNG) cylinder.

CNG is normally stored at ambient temperatures at pressures up to 3600 pounds per square inch while LNG is normally stored in a cryogenic storage vessel at temperatures of between about −240° F. and −175° F. (about −150° C. and −115° C.) and at pressures of between 15 and 200 psig. CNG has been the more broadly adopted form of fuel storage but it has a lower energy density compared to LNG. Now that natural gas is gaining greater acceptance as a fuel for transportation, the benefit of the higher energy density for LNG is attractive for vehicles that require a longer range between re-fuelling. LNG provides an energy density of about four times that of CNG with the aforementioned storage conditions. Increased demand for natural gas engines has increased the need to develop improved on-board fuel supply systems with natural gas stored as LNG instead of CNG.

Natural gas fuelled engines can operate by injecting the fuel in the engine's air intake manifold or by injecting the fuel directly into the engine's combustion chambers. In systems where fuel is injected into the engine's air intake system the required fuel supply pressure is relatively low, for example around 100 psig. In systems where the fuel is injected directly into the engine's combustion chamber and where the fuel injection pressure needs to be higher than the in-cylinder pressure the fuel supply system has to deliver natural gas to the injector at higher pressures, for example at pressures of at least 3000 psig.

LNG low pressure fuelling systems described in the prior art generally comprise a liquid conduit which supplies liquid fuel from the storage vessel to the engine through a supply line comprising a vaporizer. Fuel is stored in the storage vessel at a pressure of around 150 psi which is higher than the fuel delivery pressure to the engine which can be between 70 to 100 psi.

In these systems, heat is transferred to the LNG fuel storage vessel and a portion of the stored liquid fuel can vaporize thereby increasing the pressure inside the vessel. One method of relieving the pressure inside an LNG storage vessel is to vent the gas into the atmosphere. However this method is wasteful and can be represent a hazard. As an alternative, the existing delivery systems for low pressure engines are provided with an economizer circuit which comprises a vapor conduit through which vapor can be withdrawn from the vapor headspace in the storage vessel and can be supplied to the engine. In engine supply systems provided with an economizer circuit, most of the time, the engine operates with LNG fuel supplied from the liquid space in the storage vessel and vapor is pulled from the vapor headspace only when the pressure in the storage vessel rises above a predetermined limit set by a regulator placed in the vapour conduit. An example of such a system is described in U.S. Pat. No. 5,421,161 which illustrates an economizer circuit including means for providing a fixed back pressure in the liquid withdrawal conduit such that when the pressure in the storage vessel increases over a predetermined amount, the path of least resistance is through the vapor conduit and vapor is preferentially withdrawn from the vapor headspace of the storage vessel to thereby lower the pressure within the LNG storage tank faster.

The known systems using LNG storage vessels to supply fuel to a low pressure internal combustion engine fuelled with natural gas rely on a high saturation pressure in the storage vessel to push fuel out of the liquid space of the storage vessel and to the engine. When heat is transferred from the surrounding environment to the storage vessel, the saturation pressure of the LNG increases and can be sufficient for pushing fuel out of the vessel. When the engine operates at high load the saturation pressure of the LNG in the storage vessel can drop below a level that is required for pushing fuel out of the tank. In these situations, the engine becomes starved of fuel and can run in underperforming conditions. In these situations, the driver has to stop the vehicle and wait for the pressure in the storage vessel to increase until he can restart the vehicle.

One known method of increasing the pressure in the LNG storage vessel is to use pressure building coils interposed between the walls of a double-walled cryogenic tank which circulate low temperature fuel from the tank. Heat transferred from to the exterior through the wall of the LNG storage vessel to the pressure building coil vaporizes the liquid fuel and the created vapor can be supplied directly into the headspace of the storage vessel through a regulator when the pressure in the headspace becomes lower than a predetermined value. Such a pressure building circuit is described in U.S. Pat. No. 4,947,651. In other pressure building circuits used for cryogenic tanks in general, such as the one described in U.S. Pat. No. 5,937,655, the pressure building coil is external to the cryogenic tank. In such systems cryogenic liquid from the tank is fed to a pressure builder heat exchanger where the liquid is vaporized and the produced gas is delivered to the tank to pressurize it.

The disadvantage of the methods using pressure building circuits to pressurize a cryogenic fluid storage vessel is that the heat used for generating the vapor that is supplied to the headspace of the storage vessel to pressurize it, is also transferred to the liquid contained in the vessel reducing the vessel's fluid holding time and requiring more frequent venting.

One other disadvantage of the existing low pressure fuel supply systems which rely on the fuel saturation pressure in the storage vessel to supply fuel to the engine is that they cannot adequately supply engines with fuel under transient conditions, when the required fuel supply pressure can vary dynamically between a lower pressure that is required for low load operation and a higher pressure that is required for high load operation. This issue becomes more important if such natural gas fuel systems are installed on larger vehicles, such as heavy duty trucks, which have larger engines that consume fuel at a higher rate.

Accordingly, there is a need for a method of reliably delivering fuel from a cryogenic storage vessel into the air intake system of a gaseous fuelled internal combustion engine at low pressures, to ensure that fuel is delivered to the engine at the required fuel injection pressure and a timely manner at all times, including when the engine is started, and during different engine operating modes including during transients.

SUMMARY

A method is disclosed for delivering a fuel in a gaseous state into the air intake system of a gaseous fuelled internal combustion engine. The method comprises:

determining a required fuel flow rate demand according to an operating condition of the engine;

determining a flow rate capacity in a fuel supply system of the engine;

comparing the flow rate capacity to the required flow rate demand, and supplying fuel in gaseous state to the engine from the vapor space in the storage vessel when the flow rate capacity is equal to or higher than the required flow rate demand, or activating a fuel pump and delivering fuel to the engine from a liquid space in the storage vessel when the flow rate capacity is lower than the required flow rate demand.

A person skilled in this art of technology would understand that in the present method a parameter indicative of the flow rate capacity could be used instead of the flow rate capacity, and a parameter indicative of the engine flow rate demand could be used instead of the flow rate demand.

In this method the step of determining the required flow rate demand is determined as a function of engine operating conditions. The engine operating conditions can be determined based for example on the engine speed and requested torque. The engine operating condition can be determined from a map stored in the controller's memory that correlates the engine speed with a parameter indicative of the engine condition, for example a parameter indicative of the fuel demand, such as the requested torque.

In the present method, the step of activating the fuel pump comprises supplying hydraulic fluid from a hydraulic pump to a hydraulic drive unit that drives the fuel pump. The hydraulic pump is preferably driven by an electric motor and the electric motor is driven independently from the operation of the internal combustion engine such that the fuel pump can be activated independently of the engine condition.

In some embodiments, at least two hydraulic pumps can supply hydraulic fluid to the hydraulic drive unit that the drives the fuel pump and the present method further comprises electrically activating at least two hydraulic pumps at the same time for delivering hydraulic fluid to said hydraulic drive unit when a commanded hydraulic fluid flow rate is higher than that which can be supplied by only one hydraulic pump.

In preferred embodiments the temperature of the fuel is increased by flowing it through a heat exchanger. The method can comprise increasing the heat exchange rate in the heat exchanger when the fuel is supplied from the liquid space of the fuel storage vessel, compared to when the fuel is supplied from the vapor space of the fuel storage vessel. In other embodiments the heat exchange rate in the heat exchanger is not controlled by the system controller and is set to be constant.

If the fuel delivery system comprises a plurality of storage vessels each having a respective vapor space and a liquid space, and the present method of delivering fuel to the engine further comprises supplying fuel from the vapor space of any one of the plurality of storage vessels when the flow rate capacity is higher than the flow rate demand or activating the fuel pump and supplying fuel from one of the plurality of storage vessels when the flow capacity is lower than the flow rate demand.

This method which involves supplying fuel from one of the plurality of storage vessels can further comprise measuring the amount of fuel in each of the plurality of storage vessels and, when activating the fuel pump, supplying fuel from one of the plurality of storage vessels that has the largest amount of fuel.

If the fuel delivery system comprises a plurality of storage vessels, each having a respective vapor space and liquid space, and each having a respective fuel pump, the present method further comprises:

supplying fuel from the vapor space of any one of the plurality of storage vessels when the flow rate capacity is higher the flow rate demand; or selecting and activating one of the fuel pumps and supplying fuel from an associated one of the plurality of storage vessels when the flow rate capacity is lower than the flow rate demand.

In this method the step of selecting one of the fuel pumps that is to be activated is determined by operating each one of the fuel pumps in sequential order. Alternatively, the step of selecting one of the fuel pumps that is to be activated is determined by measuring the amount of fuel in each one of the plurality of storage vessels and selecting the one of the plurality of fuel pumps that is associated with the storage vessel that has the largest amount of fuel.

In preferred embodiments of the method where fuel is supplied from one of a plurality of fuel storage vessels, the method further comprises increasing the temperature of the fuel by flowing it through a heat exchanger associated with a respective storage vessel from which fuel is supplied to the engine.

The method further comprises:
  measuring the flow rate capacity in the delivery line before the engine is started;
  comparing the flow rate capacity in the delivery line before the engine is started to a flow rate demand at start-up; and
  activating the fuel pump when the flow rate capacity is lower than the flow rate demand at start-up.

In another embodiment of the method employed before the engine is started the fuel pump is activated when the pressure in the fuel supply system is lower than the required supply pressure at start-up.

A system is also disclosed for delivering fuel in a gaseous state into the air intake system of a gaseous fuelled internal combustion engine. The system comprises:

a) a storage vessel for holding the fuel;
b) a fuel pump fluidly connected to receive fuel from a liquid space of the storage vessel;
c) a liquid supply line in fluid communication with a discharge outlet of the fuel pump for delivering fuel from the discharge outlet of the fuel pump to a delivery line which delivers fuel to the engine;
d) a vapor supply line in fluid communication with a vapor space of the storage vessel for delivering fuel in a gaseous state from the vapor space to the delivery line;
e) a pressure sensor for measuring vapor pressure in the vapor space of the storage vessel; and
f) a controller which receives pressure measurements from the pressure sensor, determines a fuel flow capacity in the delivery line, determines a required fuel flow rate demand according to an operating condition of the engine and compares the flow rate capacity to the required flow rate demand, wherein the controller commands the fuel pump to operate when the flow rate capacity is lower than the required flow rate demand.

The system preferably comprises a heat exchanger placed in the delivery line for increasing the temperature of the fuel being supplied to the engine. The system also comprises a hydraulic pump which supplies hydraulic fluid to a hydraulic drive unit that drives the fuel pump. Preferably, the hydraulic pump is driven by an electric motor which operates independently from the operation of the engine such that the operation of the fuel pump can be controlled independently of the engine operation.

In some embodiments, the system comprises at least two hydraulic pumps which can be electrically activated to deliver hydraulic fluid to the hydraulic drive unit that drives the fuel pump. In some embodiments the fuel pump is disposed within a cryogenic space of the storage vessel.

In some embodiments the system comprises more than one storage vessel. Each storage vessel in the system has a respective vapor space and a liquid space, and is fluidly connected to the fuel pump. In these systems the controller is programmed to activate the fuel pump to supply fuel from the liquid space of one of the plurality of storage vessels when the fuel flow rate capacity is lower than the fuel flow rate demand.

In other embodiments, the system comprises more than one storage vessel, each storage vessel having a respective vapor space and liquid space, and each being fluidly connected to a respective fuel pump. In these systems the controller is programmed to select and activate one of the fuel pumps and supply fuel from a storage vessel associated with the selected fuel pump when the fuel flow rate capacity is lower than the fuel flow demand.

In preferred embodiments the system comprises an engine that is the prime mover for a vehicle.

DETAILED DESCRIPTION

Figure 1:
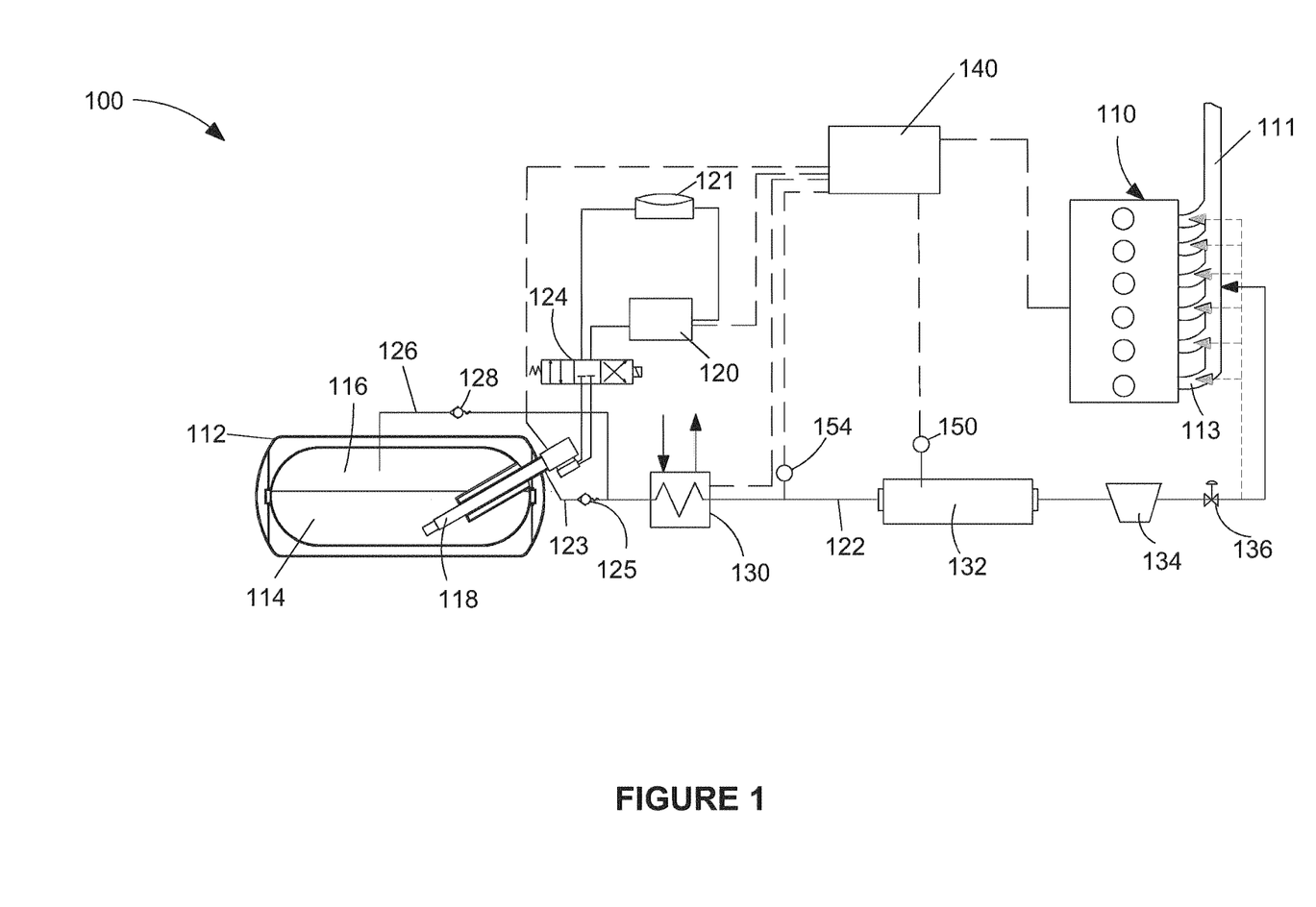
FIG. 1 is schematic diagram of a system for delivering fuel in gaseous state into the air intake system of an internal combustion engine according to the present disclosure.

FIG. 1, schematically illustrates a fuel delivery system 100 which is employed to supply a fuel in gaseous state into the air intake system of an internal combustion engine. Engine 110 is an internal combustion engine which is operated by injecting fuel into the engine's air intake manifold or into the air intake port, which is a different method than injecting fuel directly into the engine's combustion chamber. Gaseous fuel is injected into the engine's air intake manifold 111 or into the air intake ports 113 at pressures that are generally around 70 to 100 psig (pounds per square inch gauge) and can reach around 500 psig. Such pressures are much lower than the operating pressure of a direct injection internal combustion engine where gaseous fuel is injected directly into the combustion chamber at around 4000 psig.

Fuel delivery system 100 comprises fuel storage vessel 112 which stores gaseous fuel in liquefied form at cryogenic temperatures in liquid space 114 within the cryogenic space of the storage vessel. Since heat is transmitted from the surrounding environment to the walls of the storage vessel, liquid fuel stored in the vessel can vaporize and the generated vapor occupies the headspace of the storage vessel, creating a vapor space 116.

Liquid space 114 is fluidly connected to fuel pump 118 which can be placed inside the cryogenic space of the storage vessel, as illustrated in the embodiment shown in FIG. 1, or can be an external pump that communicates through a supply line with the liquid space in the storage vessel. Fuel pump 118 can be activated by starting hydraulic pump 120 which supplies hydraulic fluid from storage vessel 121 through flow switching device 124 to the hydraulic drive unit of fuel pump 118. Hydraulic pump 120 is driven by an electric motor and therefore can operate independently of the operating condition of the engine. In the existent prior art fuel delivery systems, the hydraulic pump that activates the fuel pump is mechanically actuated by the engine accessory drive and therefore depends on the engine rotation (rpm). In the present method, since hydraulic pump 120 is operated independently of the engine operating condition, it can be activated even during the time when the engine is not operating, for example, before the vehicle and/or the fuel supply system is started, as further described below.

Liquid fuel from liquid space 114 of fuel storage vessel 112 can be pumped by fuel pump 118 through liquid fuel supply line 123 to delivery line 122 which supplies fuel to engine 110. Liquid fuel supply line 123 comprises a check valve 125 which prevents fuel backflow to the storage vessel.

Fuel in vapor form can be supplied from vapor space 116 to delivery line 122 through vapor supply line 126 whose one end fluidly communicates with vapor space 116 of storage vessel 112. Vapor supply line 126 is provided with a check valve 128 to prevent fuel backflow to the storage vessel.

Liquid fuel line 123 and vapor supply line 126 are each connected to delivery line 122 downstream of their respective check valve. Delivery line 122 further comprises heat exchanger 130 which transmits heat from a heat exchange fluid to the fuel as further explained below. The heat exchange fluid in heat exchanger 130 can be for example the engine coolant. Delivery line 122 further comprises module 132 for dampening the pressure fluctuations in the stream of fuel being supplied to the engine and pressure regulator 134 for adjusting the pressure of the fuel supplied to the engine to the required engine intake pressure. Automatic fuel shut-off valve 136 is provided on delivery line 122 between pressure regulator 134 and engine 110. Fuel shut-off valve 136 is used as a safety measure for stopping any fuel flow to the engine when the engine is not operating.

The system further comprises controller 140 which commands the operation of fuel pump 118 and hydraulic pump 120 and receives measurement signals from pressure sensor 150 and from temperature sensor 154. Pressure sensor 150 measures the pressure in module 132 which is the pressure in fuel delivery line 122. Alternatively pressure sensor 150 could be placed anywhere along delivery line 122, but preferably downstream of module 132. Temperature sensor 154 measures the temperature of the fuel flowing through delivery line 122 downstream of heat exchanger 130 and controller 140 can command the operation of heat exchanger 130 to ensure that the temperature of the fuel supplied to engine 110 is higher than a predetermined limit.

Controller 140 also receives input from the engine regarding the engine speed and another parameter indicative of the engine operating condition, for example one of the parameters indicative of the fuel demand, for example the throttle position or the output torque request. The controller can determine the required fuel supply pressure based on the information from a map, which correlates the engine speed data with the other parameter indicative of the engine operating condition as further detailed below.

Figure 2:
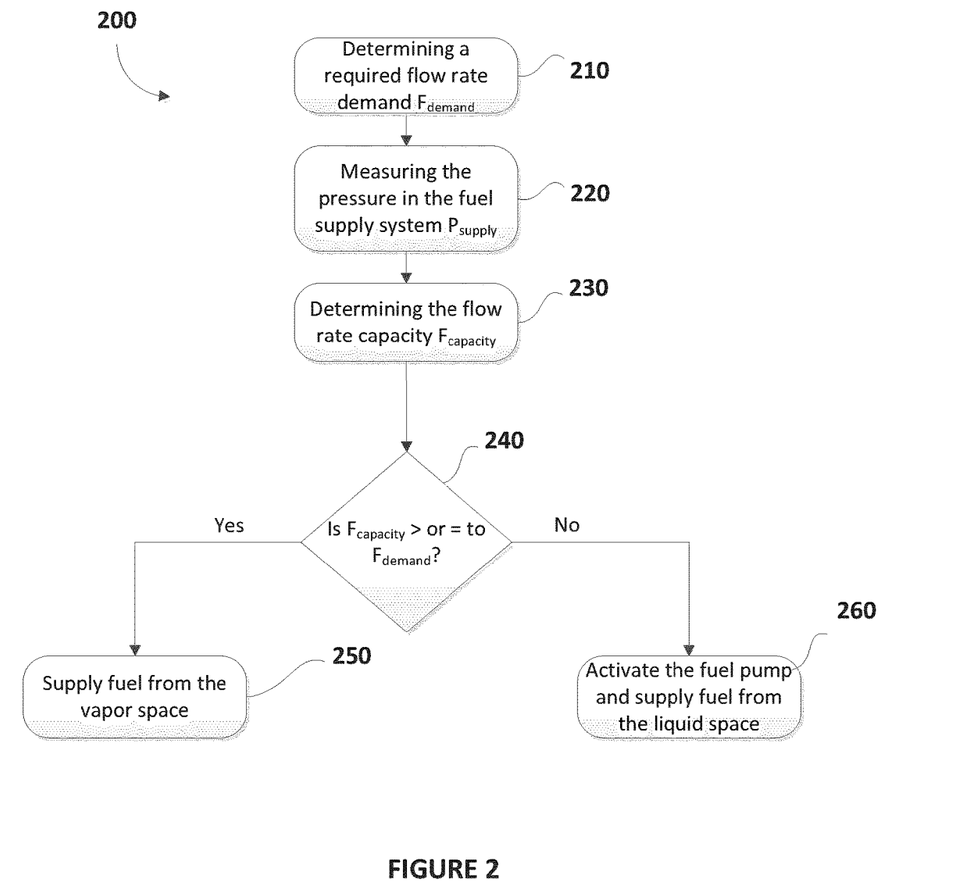
FIG. 2 is a schematic diagram illustrating a method for delivering fuel from a cryogenic storage vessel to the air intake system of a gaseous fuelled internal combustion engine according to the present disclosure.
Figure 3:
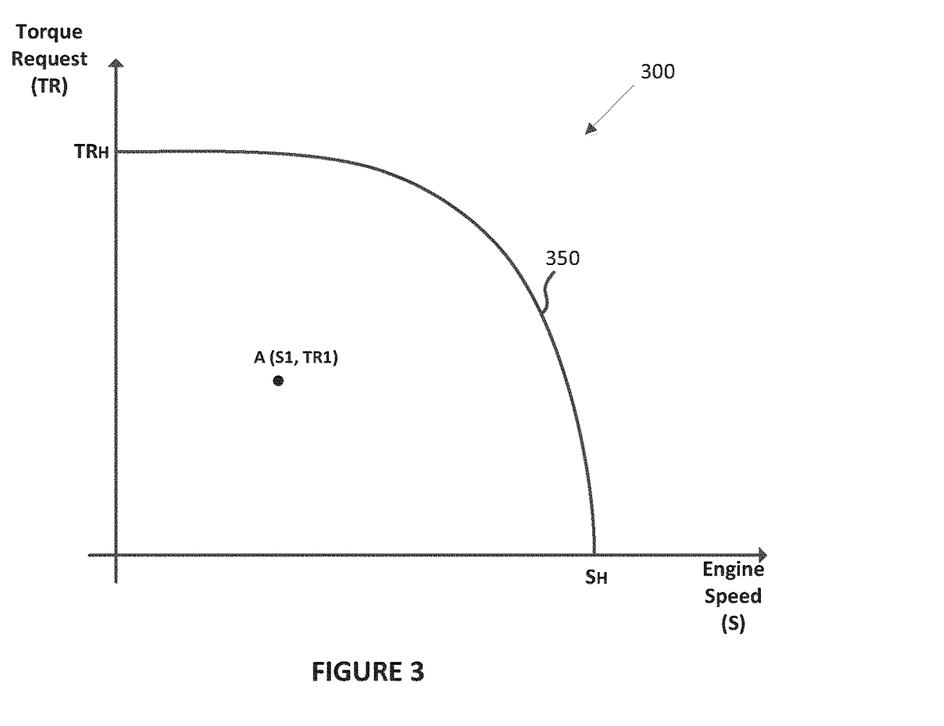
FIG. 3 is a representation of a map correlating the engine speed with the torque request which is used by the system's controller to determine the engine operating condition.

The method of delivering fuel in gaseous state into the air intake system of a gaseous fuelled internal combustion engine will now be described in relation to the embodiment of the fuel delivery system illustrated in FIG. 1. The steps of the method are illustrated in FIG. 2. In first step 210 of method 200, controller 140 determines the required flow rate demanded by the engine. At this step, controller 140 receives information from the engine regarding its operating condition and uses the map illustrated in FIG. 3 to determine a point on the map which indicates the current engine operating condition. The point on the map indicating the current engine operating conditions will be found on the area of the map delimited by boundary line 350 which is set by a high engine speed $S_H$ and a high torque request $TR_H$. If the engine operates for example at a point A, which is characterized by coordinates $(S_1, T_{R1})$ corresponding to a value $S_1$ for the engine speed and a value $T_{R1}$ for the torque request controller 140 can determine based on predetermined algorithms, the flow rate demanded by the engine $F_{demand}$ required for operating the engine efficiently.

In next step 220 of the present method, the pressure in the fuel supply system ($P_{supply}$) is measured. This step comprises measuring the pressure in module 132, by pressure sensor 150 and communicating the measured value to controller 140. Alternatively the pressure in the fuel supply system can be measured by measuring the pressure in vapor space 116 of fuel storage vessel 112 or measuring the pressure anywhere in delivery line 122. Pressure sensor 150 can therefore be placed anywhere in the fuel supply system, but in preferred embodiments pressure sensor 150 measures the pressure in module 132, as illustrated, or in delivery line 122 downstream of module 132 and upstream of pressure regulator 134.

In the next step, the flow rate capacity $F_{capacity}$ in fuel delivery line is determined based on the measured supply pressure $P_{supply}$ according to a look-up table which correlates the flow rate capacity to the measured supply pressure. The flow rate capacity in the fuel delivery line is defined to be the estimated maximum flow rate that can be achieved in the fuel delivery line at the measured pressure. The look-up table correlating the flow capacity to the measured supply pressure can be determined based on experimental tests. Alternatively, an algorithm for determining the flow capacity based on the measured supply pressure could be developed which takes into consideration the measured supply pressure, the temperature and the viscosity of the fuel and other parameters dependent on the physical characteristics of the fuel delivery line (e.g. fittings, hose or conduit sizes). Such an algorithm would therefore also take into consideration the predicted pressure drop in the delivery line between where the pressure is measured and the engine inlet.

In some embodiments, the flow capacity can be estimated based directly on the measured flow rate in delivery line 122.

In the next step 240, the flow capacity $F_{capacity}$ is compared to the required flow rate demand $F_{demand}$, which was determined in previous step 210. If the estimated flow capacity $F_{capacity}$ is equal to or higher than the predetermined required flow rate demand $F_{demand}$, fuel is supplied in gaseous state from vapor space 116 in storage vessel 112 through vapor supply line 126 to fuel delivery line 122, which is step 250 of the present method. If the measured pressure in the vapor space is lower than the predetermined required fuel supply pressure, the controller executes step 260 of the present method and activates fuel pump 118 whereby fuel is supplied from liquid space 114 through liquid fuel supply line 123 to fuel delivery line 122.

The temperature of the fuel supplied to fuel delivery line 122 is increased by flowing the fuel through heat exchanger 130. If fuel is supplied from liquid space 114 the heat exchange rate in heat exchanger 130 is increased compared to when the fuel is supplied from vapor space 116 because the temperature of the fuel supplied from the liquid space is slightly lower than the temperature of the fuel supplied in vapor state from the vapor space.

The advantage of the present method over the known methods for delivering fuel in gaseous state to the air intake system of a gaseous fuelled engine is that fuel can be delivered to the engine without relying on the fuel saturation pressure to push the fuel out of the storage vessel.

Figure 7A:
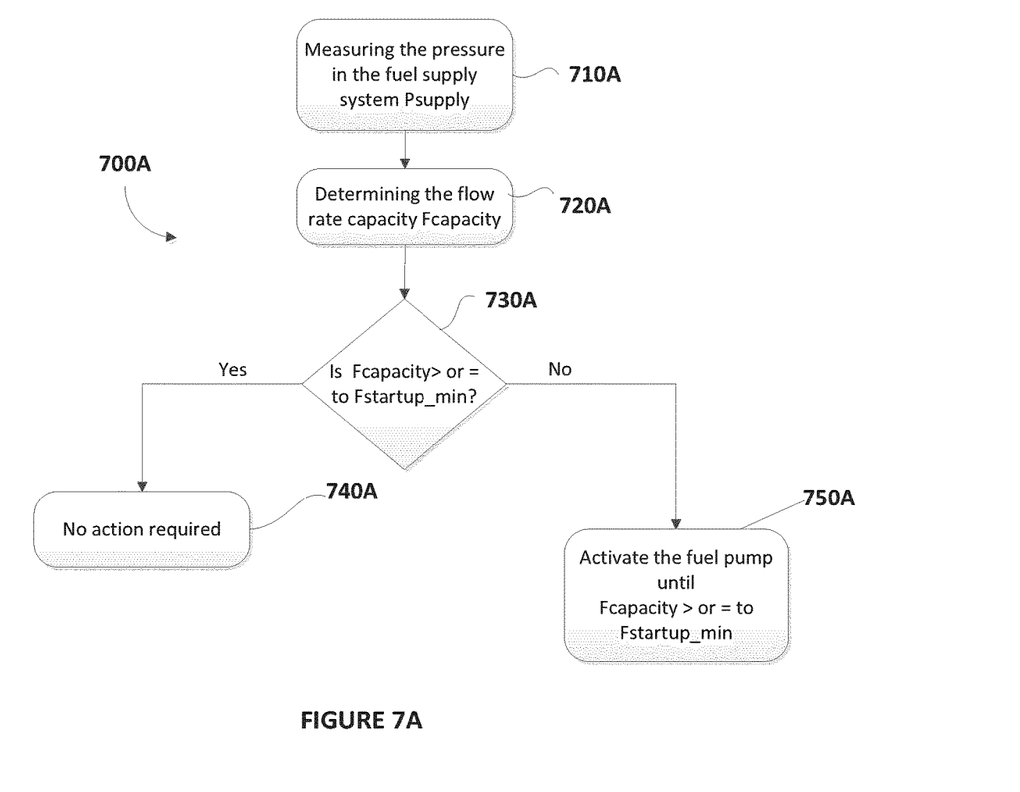
FIG. 7A is a schematic diagram illustrating a method for delivering fuel from a cryogenic storage vessel to the air intake system of a gaseous fuelled internal combustion engine, at start-up, by taking into consideration the flow rate capacity in the fuel supply system.
Figure 7B:
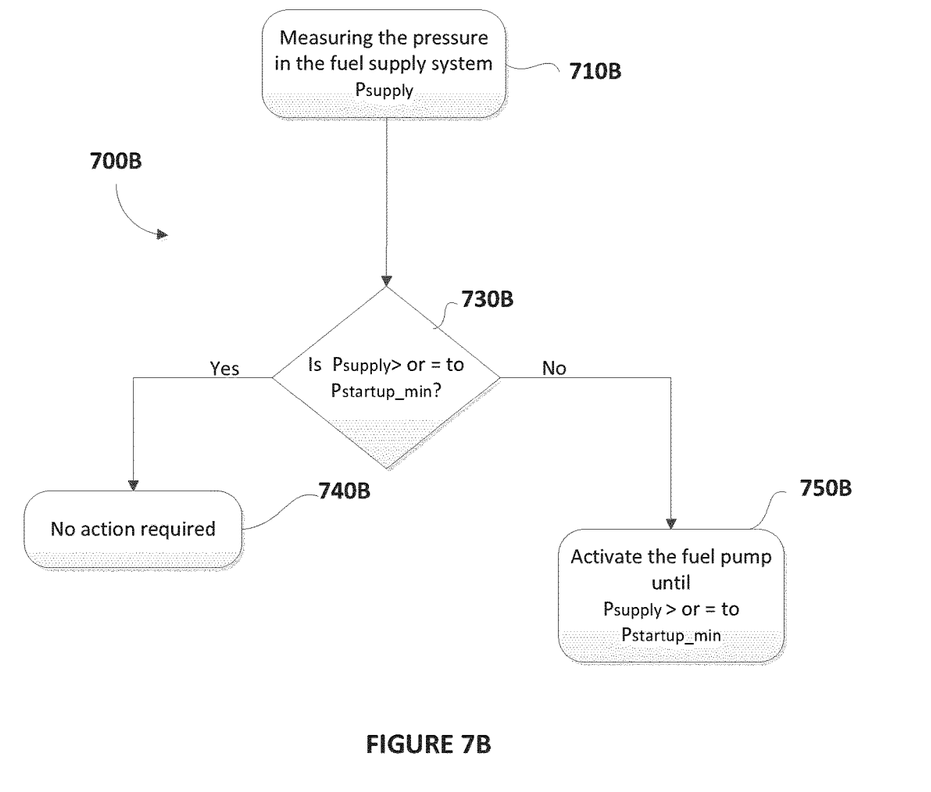
FIG. 7B is a schematic diagram illustrating a method for delivering fuel from a cryogenic storage vessel to the air intake system of a gaseous fuelled internal combustion engine, at start-up, by taking into consideration the pressure in the fuel supply system.

Another advantage of the present system is that fuel can be delivered promptly when the engine starts. In previously known systems, the hydraulic pump that activates the fuel pump is mechanically actuated by the engine accessory drive and therefore depends on the engine rotation (rpm). In the present system, hydraulic pump 120 is powered by an electric motor and can be operated independently of engine operation, for example the hydraulic pump can be activated, if needed, when the engine has not yet been started, as further described here and illustrated in FIG. 7.

Before the vehicle is started, for example, when the driver has inserted the key into the ignition, the pressure in fuel delivery line 122 is measured by pressure sensor 150 and the measured fuel pressure in delivery line 122 ($P_{supply}$) is communicated to controller 140. Controller 140 is programmed to determine the flow rate capacity in delivery line 122 ($F_{capacity}$) and compare it to the minimum flow rate demanded by the engine at start-up ($F_{start\text{-}up\_min}$). $F_{start\text{-}up\_min}$ has a unique value that depends on the particular system's characteristics and that is stored in the memory of the controller. The method 700A of starting up the system is illustrated in FIG. 7A which shows at 710A the step of measuring the pressure in the fuel system, or more specifically the pressure in fuel delivery line 122 and at step 720A, determining the flow rate capacity ($F_{capacity}$) from a look-up table which correlates the flow rate capacity with the measured supply pressure. The method further comprises, at step 730A, comparing $F_{capacity}$ to $F_{startup\_min}$ which is the minimum flow rate demanded by the engine at star-up. If the flow capacity in fuel delivery line 122 is equal to or higher than the minimum flow rate demand at startup, no further action is required (step 740A). If the flow capacity in fuel delivery line 122 is lower than the minimum flow capacity demanded by the engine at startup, at step 750A, fuel pump 118 is activated and pumps fuel from liquid space 114 to fuel delivery line 122 thereby increasing the pressure therein until the flow rate capacity in delivery line 122 becomes at least equal to the minimum fuel rate demanded by the engine at startup $P_{startup\_min}$. Once the target flow rate capacity in delivery line 122 has been reached fuel pump 118 is stopped and method 700A is started again from step 710. If engine 110 is started, controller 140 is programmed to switch to method 200 illustrated in FIG. 2.

A similar method 700B which is employed at start-up is illustrated in FIG. 7B. Before the vehicle is started, for example, when the driver has inserted the key into the ignition, the pressure in fuel delivery line 122 is measured by pressure sensor 150 at step 710B and the measured fuel pressure in delivery line 122 ($P_{supply}$) is communicated to controller 140. In some embodiments, instead of measuring the pressure in the fuel delivery line, the pressure in vapor space 116 of fuel storage vessel 112 is measured and communicated to the controller as $P_{supply}$. At step 730B, $P_{supply}$ is compared to $P_{startup\_min}$ which is the minimum fuel supply pressure demanded by the engine at startup. If the pressure in fuel delivery line 122, $P_{supply}$, is equal to or higher than the minimum fuel supply pressure required at startup $P_{startup\_min}$, no further action is required (step 740B). If the pressure in fuel delivery line 122 is lower than the minimum fuel supply pressure required at startup, at step 750B, fuel pump 118 is activated and pumps fuel from liquid space 114 to fuel delivery line 122 thereby increasing the pressure therein such that it becomes at least equal to the minimum fuel supply pressure $P_{startup\_min}$. Once the target pressure in delivery line 122 has been reached fuel pump 118 is stopped and method 700B is started again from step 710. If engine 110 is started, controller 140 is programmed to switch to method 200 illustrated in FIG. 2.

The method illustrated in FIG. 7 reduces the amount of time required for starting up the system, because the pressure, or respectively the flow rate capacity in the fuel delivery line is already at the predetermined level required for starting up the engine. Such method would very difficult to implement with the known systems where the hydraulic pumps that activate the fuel pump are mechanically actuated by the engine accessory drive and therefore require that the engine is started before the fuel pump can be actuated.

Figure 4:
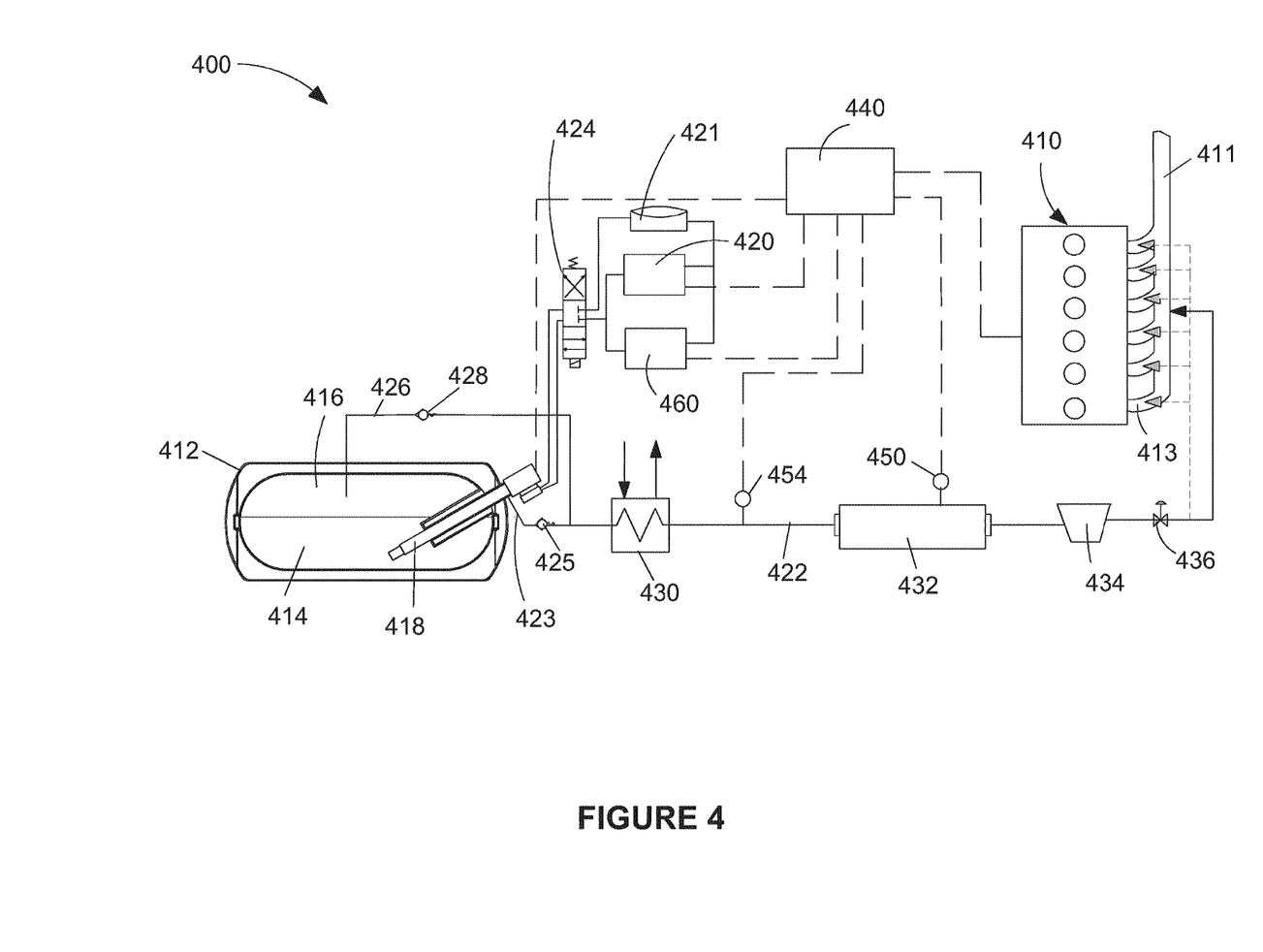
FIG. 4 is schematic diagram of another embodiment of a fuel delivery system comprising two hydraulic pumps for supplying hydraulic fluid to the hydraulic drive unit of the system's fuel pump.
Figure 5:
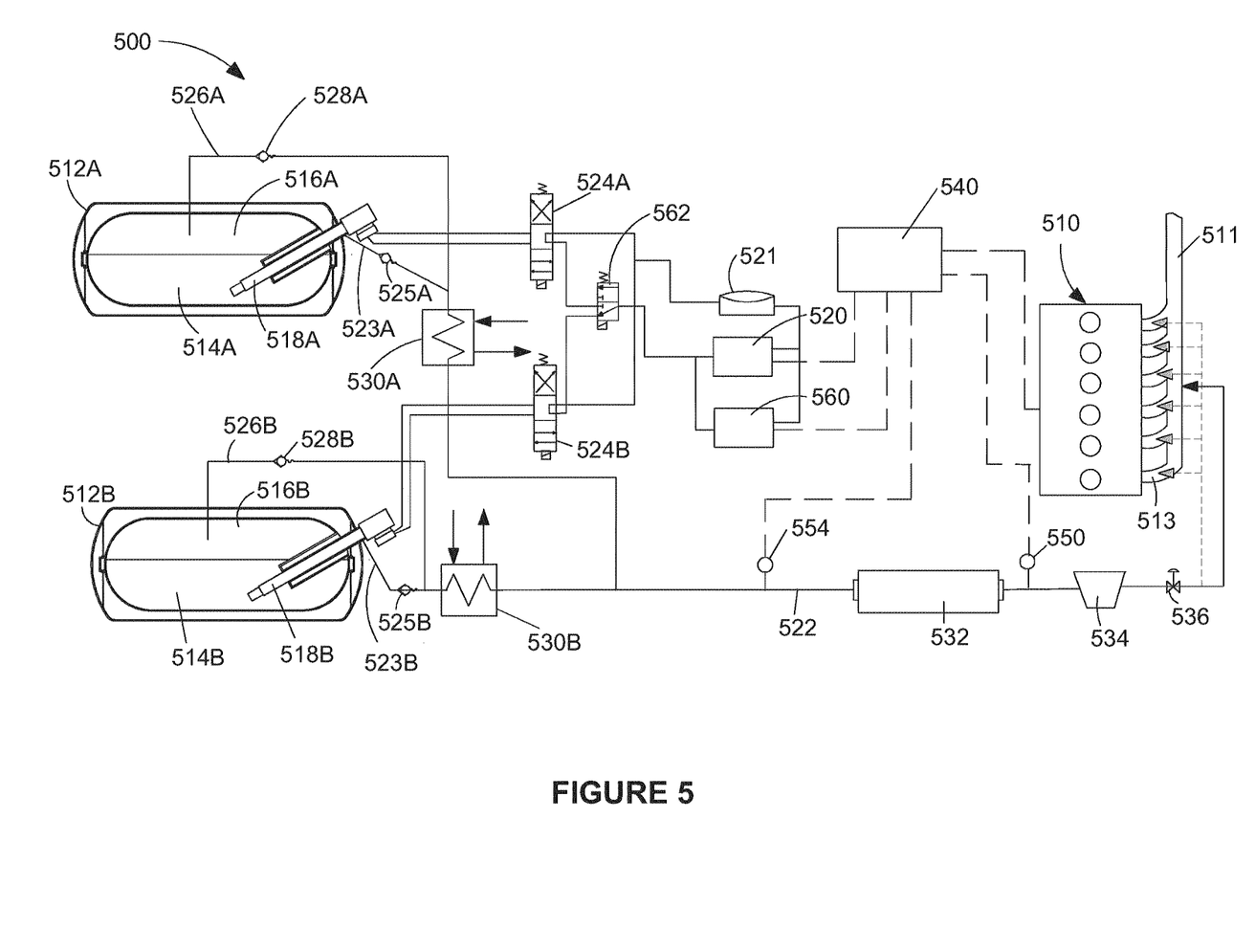
FIG. 5 is a schematic diagram of another embodiment of a fuel delivery system comprising two fuel storage vessels, each storage vessel being associated with a fuel pump, and a controller which activates each of the fuel pumps according to the method described in the present disclosure.
Figure 6:
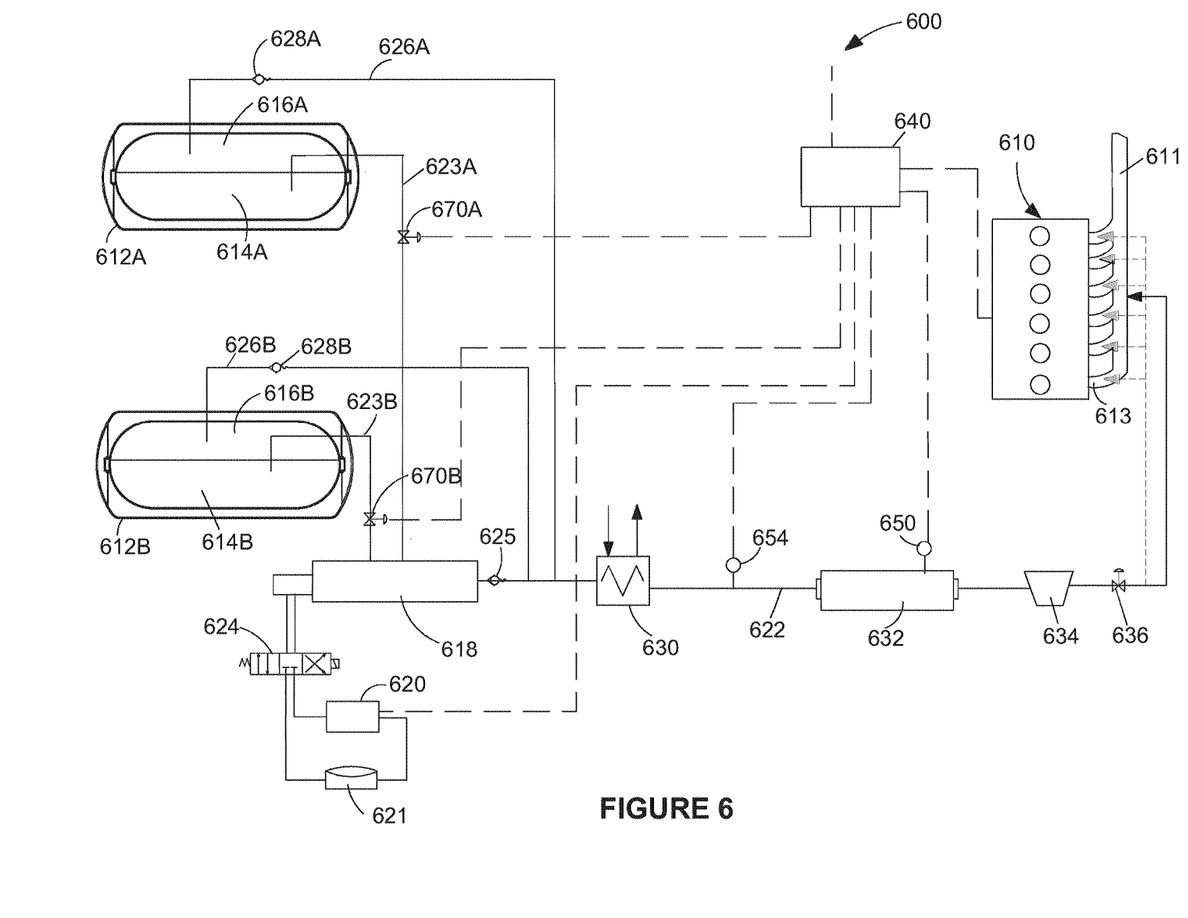
FIG. 6 is a schematic diagram of another embodiment of a fuel delivery system comprising two fuel storage vessels which are both fluidly connected to one external fuel pump and a controller which activates the fuel pump according to the method described in the present disclosure.

Other embodiments of fuel delivery system are illustrated in FIGS. 4 to 6. These embodiments have many components that are equivalent to like components of the embodiment presented in FIG. 1 and like components are identified by like reference numbers. Persons skilled in the technology will understand that in this disclosure like-numbered components function in substantially the same way in each embodiment. Accordingly, if like components have already been described with respect to one embodiment, while identified in the figures for other embodiments, the purpose and function of like components may not be repeated for each of the illustrated embodiments.

FIG. 4 illustrates another embodiment of the present fuel delivery system. Fuel delivery system 400 is delivering fuel in gaseous state from cryogenic storage vessel 412 to air intake manifold 411 or to air intake ports 413 of gaseous fuelled internal combustion engine 410. Fuel can be delivered to fuel delivery line 422 either from vapor space 416 through vapor supply line 426 or it is supplied by fuel pump 418 from liquid space 414 through liquid fuel supply line 423. Liquid supply line 423 and vapor supply line 426 are each provided with a check valve 425 and respectively 428 for preventing fuel backflow. Fuel passing through fuel delivery line 422 is heated in heat exchanger 430 and the pressure fluctuations in the fuel stream are dampened in module 432. Pressure regulator 434 regulates the fuel pressure to the engine intake pressure. Automatic shut-off valve 436 is provided as a safety measure during the times when the engine is not operating. The pressure in fuel delivery line 422 is measured by measuring the pressure in module 432 through pressure sensor 450.

System 400 illustrated in FIG. 4 is different than the system illustrated in FIG. 1 in that it uses two hydraulic pumps 420 and 460 for activating fuel pump 418. Hydraulic pumps 420 and 460 supply hydraulic fluid from storage vessel 421 through flow switching unit 424 to the hydraulic drive unit that drives fuel pump 418. In this arrangement, both hydraulic fluid pumps can be used at the same time when the hydraulic fluid flow rate commanded by controller 440 is higher than that which can be supplied by only one hydraulic pump.

In this embodiment heat exchanger 430 is not commanded by controller 440 and provides the same amount of heat to the fuel flowing through delivery line 422 independently of where the fuel is supplied from. The temperature of the fuel flowing through fuel delivery line 422 is measured by temperature sensor 454 and communicated to controller 440.

The method of delivering fuel from storage vessel 412 to engine 410 is the same as the method described in relation to FIG. 2 and therefore it will not be described here in great detail. The pressure in delivery line 422 ($P_{supply}$), measured by pressure sensor 450, is used for determining the flow rate capacity ($F_{capacity}$) which is then compared to the required flow rate demanded by the engine ($F_{demand}$). If the flow rate capacity in delivery line 422 is equal to or higher than the required flow rate demanded by the engine, fuel is supplied in gaseous state from vapor space 416 to the engine, and if the flow rate capacity in delivery line 422 is lower than the required fuel rate demanded by the engine, fuel pump 418 is activated and fuel is delivered by the pump from liquid space 414 to the engine. The required fuel supply pressure is determined following the same algorithm as the one applied for the system illustrated in FIG. 1.

Before engine 410 is started, controller 440 is programmed to execute the same steps as described in relation to method 700A or 700B for providing a minimum startup pressure in delivery line 422 at the time the engine starts to operate. For this purpose, either hydraulic pump 420 or 460 can be used to activate fuel pump 418.

FIG. 5 illustrates another embodiment of the present fuel delivery system. Fuel delivery system 500 is delivering fuel in gaseous state to air intake manifold 511 or to air intake ports 513 of gaseous fuelled internal combustion engine 510. Fuel system 500 is different than the previous embodiments because it comprises two cryogenic storage vessels 512A and 512B, each storage vessel having a respective vapor space 516A and 516B, and a respective liquid space 514A and 514B, and being fluidly connected to a respective fuel pump 518A and 518B.

Each of the two fuel pumps 518A or 518B is activated by supplying hydraulic fluid from hydraulic storage vessel 521 through one of the two hydraulic pumps 520 or 560 or through both of them, through flow switching unit 562, and further through one of the flow switching units 524A or 524B, to the hydraulic drive unit of the respective fuel pump to be activated. Hydraulic fluid pumps 520 and 560 are driven by an electric motor and therefore can be operated independently from the operation of the internal combustion engine. Therefore, a similar method with the one of the methods described in relation with FIG. 7A or 7B

Similar to the other embodiments described here, pressure in fuel delivery line 522 is measured by pressure sensor 550. Pressure fluctuations in fuel delivery line 522 are dampened in module 532. Temperature in fuel delivery line 522 is measured by temperature sensor 554. Automatic shut-off valve 536 is provided as a safety measure on fuel delivery line 522 during the times when the engine is not operating.

A similar method of delivering fuel to the engine as described in relation to FIGS. 1 and 4 is applied here. The pressure in delivery line 522 is measured by pressure sensor 550 and communicated to controller 540. As illustrated in FIG. 5, pressure sensor 550 measures the pressure in delivery line 522, instead of measuring the pressure in the module for dampening the pressure fluctuations, but in other embodiments sensor 550 could measure the pressure anywhere in the fuel supply system, including in module 532 or anywhere along delivery line 522. Controller 540 determines the flow rate capacity in delivery line 522 by using look-up tables or algorithms that correlate the flow rate capacity with the measured pressure in the delivery line, and then compares the flow rate capacity in the delivery line with the required flow rate demanded by the engine which is determined in a similar way as in the methods described in relation to FIGS. 1 and 4 and fuel is supplied from a vapor space of one of storage vessels 512A or 512B based on fuel availability, for example, or other factors. Fuel is supplied from the respective vapor space through vapor liquid line 526A or 526B and through heat exchanger 530A or 530B to delivery line 522. When the flow rate capacity in the fuel supply system is lower than the flow rate demanded by the engine, controller 540 selects and activates one of the two fuel pumps 518A and 518B to supply fuel from the liquid space of the storage vessel associated with the activated pump. Liquid fuel is supplied through a respective liquid supply line 523A or 523B and through heat exchanger 530A or respectively 530B to delivery line 522. Liquid fuel supply lines 523A and 523B and vapor supply lines 526A and 526B are each provided with a check valve 525A, 525B and respectively 528A, 528B to prevent backflow.

In the embodiment illustrated in FIG. 5 controller 540 selects which one of the two fuel pumps should be activated such that the two fuel pumps are operated in sequential order. Alternatively, the amount of fuel remaining in each storage vessel 512A and 512B is measured and controller 540 selects one of fuel pumps 518A or 518B based on which storage vessel has the most fuel.

Furthermore, a similar method employed before the engine is started, for achieving the minimum start-up flow rate capacity or the minimum fuel supply pressure in the delivery line as described in relation with FIGS. 1 and 4 and illustrated in FIG. 7A or 7B is applied here. For this purpose, either hydraulic pump 520 or 560 can be used to activate either fuel pump 518A or 518B so that the flow capacity in delivery line 522 or the pressure in delivery line 522 is raised to $F_{startup\_min}$ or respectively, $P_{startup\_min}$ before the engine is started. The same criteria of selecting which fuel pump should be activated as described earlier in relation to the normal operation of the system can be applied here.

Even if only two storage vessels are shown in the embodiment illustrated in FIG. 5, a person skilled in this technology would easily recognize that the system can comprise more than two cryogenic storage vessels and that the method of selecting and activating one fuel pump for supplying fuel from a liquid space of one storage vessel will be similar to the method described above.

FIG. 6 illustrates another fuel delivery system 600 for delivering fuel in gaseous state to air intake manifold 611 or to air intake ports 613 of gaseous fuelled internal combustion engine 610. Fuel system 600 is different than the previous embodiments because it comprises one external fuel pump 618 and two cryogenic storage vessels 612A and 612B whereby fuel pump 618 can supply fuel from liquid space 614A or 614B of the respective storage vessels 612A and 612B. Fuel pump 618 is activated when hydraulic pump 620 supplies hydraulic fluid from storage vessel 621 to the hydraulic drive unit of the fuel pump 618 through flow switching unit 624.

Similar to the other embodiments described here, pressure fluctuations in fuel delivery line 622 are dampened in module 632. Automatic shut-off valve 636 is provided as a safety measure on fuel delivery line 622 during the times when the engine is not operating. Vapor supply lines 626A and 626B are each provided with a check valve 628A and respectively 628B and check valve 625 is provided on delivery line 622 downstream of fuel pump 618 to prevent fluid backflow.

A similar method of delivering fuel to the engine as described in relation to FIGS. 1, 4 and 5 is applied here. Pressure in the fuel supply system is measured by measuring the pressure in module 632 through pressure sensor 650 and communicated to controller 640. Controller 640 determines flow rate capacity in delivery line 622 and compares it to the flow rate demanded by the engine as in the methods described in relation to FIGS. 1, 4 and 5 and fuel is supplied from a vapor space of one of storage vessels 612A or 612B. Fuel is supplied from the respective vapor space through vapor liquid line 626A or 626B and through heat exchanger 630 to delivery line 622. When the flow rate capacity in delivery line 622 is lower than the flow rate demanded by the engine, controller 640 activates fuel pump 618 to supply fuel from the liquid space of one of the two storage vessels 612A or 612B. Fuel is supplied from liquid space 614A or 614B through respective liquid supply line 623A or 623B to delivery line 622.

In this embodiment each liquid supply line 623A and 623B is provided with a shut-off valve 670A and respectively 670B which can be commanded by controller 640. The amount of fuel in each storage vessel is measured and fuel is supplied from the storage vessel which has the most fuel. For example, when it is determined that storage vessel 612A has the most fuel, controller 640 commands shut-off valve 670B to close and fuel pump 618 supplies fuel from liquid space 614A to delivery line 622. Alternatively if it is determined that storage vessel 612B has the most fuel controller 640 commands shut-off valve 670A to close and fuel pump 618 supplies fuel from liquid space 614B to delivery line 622.

The pressure measurements in this embodiment are communicated by pressure sensor 650 to controller 640 and the temperature of the fuel flowing through delivery line 622 is measured by temperature sensor 654.

In this embodiment, the required flow rate demanded by the engine and the flow capacity in delivery line 622 are determined following the same logic as the one applied for the systems illustrated in FIGS. 1, 4 and 5, and a similar method to the one described in relation to FIG. 2 is applied here.

A similar method of building the minimum startup pressure in the delivery line as described in relation with FIGS. 1, 4 and 5 and illustrated in FIG. 7A or 7B is applied here. For this purpose, hydraulic pump 620 can be used to activate fuel pump 618 so that the pressure in delivery line 522 is raised to $P_{startup\_min}$ before the engine is started.

Even if only two storage vessels are shown in the embodiment illustrated in FIG. 6, a person skilled in this technology would easily recognize that the system can comprise more than two cryogenic storage vessels and that the same methods illustrated in FIG. 2, 7A or 7B would apply.

The present invention has been described with regard to a plurality of illustrative embodiments. However, it will be apparent to persons skilled in the art that a number of variations and modifications can be made without departing from the scope of the invention as defined in the claims.

We claim:

1. A method for delivering a fuel in a gaseous state into an air intake system of a gaseous fuelled internal combustion engine, said method comprising:
   determining a required fuel flow rate demand according to an operating condition of said internal combustion engine;
   determining a flow rate capacity in a fuel supply system of said internal combustion engine;
   comparing said flow rate capacity to said required flow rate demand; and
   supplying said fuel in said gaseous state from said vapor space in said storage vessel when said flow capacity is equal to or higher than said required flow rate demand; or
   activating a fuel pump and delivering fuel from a liquid space in said storage vessel when said flow rate capacity is lower than said required flow rate demand.

2. The method of claim 1 wherein determining said required flow rate demand is determined as a function of engine operating conditions.

3. The method of claim 2 wherein said required flow rate demand is determined based on an engine speed and torque.

4. The method of claim 1 wherein the step of activating said fuel pump comprises supplying hydraulic fluid from a hydraulic pump to a hydraulic drive unit that drives said fuel pump.

5. The method of claim 4 wherein said hydraulic pump is a first one of at least two hydraulic pumps, the method further comprising electrically activating at least one additional hydraulic pump to deliver hydraulic fluid to said hydraulic drive unit when a commanded hydraulic fluid flow rate is higher than that which can be supplied by said first one of at least two hydraulic pumps.

6. The method of claim 1 further comprising increasing the temperature of said fuel by flowing it through a heat exchanger.

7. The method of claim 1 wherein said storage vessel is a first one of a plurality of storage vessels each having a respective vapor space and a liquid space, said method further comprising:
   supplying said fuel from said vapor space of any one of said plurality of storage vessels when said flow rate capacity is higher than said flow rate demand; or
   activating said fuel pump and supplying said fuel from one of said plurality of storage vessels when said flow rate capacity is lower than said flow rate demand.

8. The method of claim 7, said method further comprising measuring the amount of fuel in each of said plurality of storage vessels and, when activating said fuel pump, supplying said fuel from one of said plurality of storage vessels that has the most of said fuel.

9. The method of claim 1 wherein said storage vessel is a first one of a plurality of storage vessels each having a respective vapor space and liquid space, and each having a respective fuel pump, said method further comprising:
   supplying said fuel from said vapor space of any one of said plurality of storage vessels when said flow rate capacity is higher than said flow rate demand; or
   selecting and activating one of said fuel pumps and supplying said fuel from an associated one of said plurality of storage vessels when said flow rate capacity is lower than said flow rate demand.

10. The method of claim 9 wherein selecting one of said fuel pumps that is to be activated is determined by operating each one of said fuel pumps in sequential order.

11. The method of claim 9 wherein selecting one of said fuel pumps that is to be activated is determined by measuring the amount of fuel in each one of said plurality of storage vessels and selecting the one of said plurality of fuel pumps that is associated with the storage vessel that has the most of said fuel.

12. The method of claim 9 further comprising increasing the temperature of said fuel by flowing it through a heat exchanger associated with a respective storage vessel from which fuel is supplied to said internal combustion engine.

13. A method of claim 1 further comprising:
   measuring a pressure in said fuel supply system;
   comparing said measured pressure in said fuel supply system with a required supply pressure at start-up; and
   activating said fuel pump when said pressure in said fuel supply system is lower than said required supply pressure at start-up.

14. A system for delivering a fuel in a gaseous state into an air intake system of a gaseous fuelled internal combustion engine, said system comprising:
   a. a storage vessel for holding said fuel;
   b. a fuel pump fluidly connected to receive fuel from a liquid space of said storage vessel;
   c. a liquid supply line in fluid communication with a discharge outlet of said fuel pump for delivering fuel from said discharge outlet of said fuel pump to a delivery line which delivers fuel to said internal combustion engine;
   d. a vapor supply line in fluid communication with a vapor space of said storage vessel for delivering fuel in a gaseous state from said vapor space to said delivery line;
   e. a pressure sensor for measuring pressure in said delivery line; and
   f. a controller which receives pressure measurements from said pressure sensor, determines a fuel flow capacity in said delivery line, determines a required fuel flow rate demand according to an operating condition of said internal combustion engine and compares said flow capacity in said delivery line to said required flow rate demand, wherein said controller commands said fuel pump to operate when said flow rate capacity is lower than said required flow rate demand.

15. The system of claim 14 further comprising a heat exchanger placed in said delivery line for increasing the temperature of said fuel being supplied to said internal combustion engine.

16. The system of claim 14 further comprising a hydraulic pump which supplies hydraulic fluid to a hydraulic drive unit that drives said fuel pump.

17. The system of claim 16 wherein said hydraulic pump is a first one of at least two hydraulic pumps which can be electrically activated to deliver hydraulic fluid to said hydraulic drive unit that drives said fuel pump.

18. The system of claim 14 wherein said fuel pump is disposed within a cryogenic space of said storage vessel.

19. The system of claim 14 wherein said storage vessel is a first one of a plurality of storage vessels each having a respective vapor space and a liquid space, and being fluidly connected to said fuel pump, and wherein said controller is programmed to activate said fuel pump to supply fuel from said liquid space of one of said plurality of storage vessels when said flow rate capacity is lower than said flow rate demand.

20. The system of claim 14 wherein said storage vessel is a first one of a plurality of storage vessels each having a respective vapor space and a liquid space, and each being fluidly connected to a respective fuel pump, and wherein said controller is programmed to select and activate one of said fuel pumps and supply fuel from one of said plurality of storage vessels which is associated with said activated fuel pump when said flow rate capacity is lower than said flow rate demand.

* * * * *

UNITED STATES PATENT AND TRADEMARK OFFICE
CERTIFICATE OF CORRECTION

PATENT NO. : 9,897,055 B2
APPLICATION NO. : 15/037622
DATED : February 20, 2018
INVENTOR(S) : Gregory A. Batenburg et al.

It is certified that error appears in the above-identified patent and that said Letters Patent is hereby corrected as shown below:

On the Title Page

Page 2, Column 2, Line 1, under Item (56) References Cited:
"5,937,655 A, 8/1999, Weller et al." should read --5,937,655 A, 8/1999, Weiler et al.--

In the Claims

Column 13, Line 32:
"supplying said fuel in said gaseous state from said vapor" should read --supplying said fuel in a gaseous state from a vapor--

Signed and Sealed this
Eighth Day of May, 2018

Andrei Iancu
*Director of the United States Patent and Trademark Office*